US010839991B2

(12) United States Patent
Hsiao et al.

(10) Patent No.: US 10,839,991 B2
(45) Date of Patent: Nov. 17, 2020

(54) METHOD FOR MANUFACTURING SHUNT RESISTOR

(71) Applicant: YAGEO CORPORATION, Kaohsiung (TW)

(72) Inventors: Shen-Li Hsiao, Kaohsiung (TW); Kuang-Cheng Lin, Kaohsiung (TW); Hwan-Wen Lee, Kaohsiung (TW); Chih-Lung Chen, Kaohsiung (TW)

(73) Assignee: YAGEO CORPORATION, Kaohsiung (TW)

( * ) Notice: Subject to any disclaimer, the term of this patent is extended or adjusted under 35 U.S.C. 154(b) by 271 days.

(21) Appl. No.: 15/963,117

(22) Filed: Apr. 26, 2018

(65) Prior Publication Data

US 2019/0287701 A1 Sep. 19, 2019

(30) Foreign Application Priority Data

Mar. 14, 2018 (CN) .......................... 2018 1 0208505

(51) Int. Cl.
| | |
|---|---|
| *H01C 1/14* | (2006.01) |
| *B23K 11/00* | (2006.01) |
| *H01C 1/144* | (2006.01) |
| *B23K 3/03* | (2006.01) |
| *H01C 17/28* | (2006.01) |

(52) U.S. Cl.
CPC ........... *H01C 1/144* (2013.01); *B23K 3/0307* (2013.01); *B23K 11/002* (2013.01); *H01C 17/28* (2013.01)

(58) Field of Classification Search
CPC ........ H01C 1/144; H01C 17/28; H01C 1/148; H01C 13/00; H01C 17/281; B23K 11/002
See application file for complete search history.

(56) References Cited

U.S. PATENT DOCUMENTS

| 3,808,575 | A | * | 4/1974 | Brandt | .................. | H01C 1/144 338/262 |
| 2003/0038368 | A1 | * | 2/2003 | Maeda | ............... | B23K 11/0006 257/734 |
| 2012/0229247 | A1 | * | 9/2012 | Yoshioka | ............... | G01R 1/203 338/49 |

(Continued)

FOREIGN PATENT DOCUMENTS

| CN | 1545106 A | 11/2004 |
| CN | 101097232 A | 1/2008 |

(Continued)

*Primary Examiner* — Brian W Jennison

(74) *Attorney, Agent, or Firm* — CKC & Partners Co., LLC

(57) ABSTRACT

In a method for manufacturing a shunt resistor, a resistor plate with a first side surface and a second side surface opposite to each other is provided. A first electrode plate and a second electrode plate are respectively pressed onto the first side surface and the second side surface, thereby forming a first connection surface between the first electrode plate and the resistor plate, and a second connection surface between the second electrode plate and the resistor plate. A first conductive module is placed on opposite ends of the first connection surface, and a second conductive module is placed on opposite ends of the second connection surface. Current is applied to the first and second connection surfaces via the first and second conductive modules respectively to weld the first electrode plate and the resistor plate, and to weld the second electrode plate and the resistor plate.

9 Claims, 4 Drawing Sheets

(56) References Cited

U.S. PATENT DOCUMENTS

2014/0097933 A1*  4/2014  Yoshioka .............. H01C 1/144
                                                        338/332

FOREIGN PATENT DOCUMENTS

| CN | 100481277 C | 4/2009 |
|----|-------------|--------|
| CN | 101483091 B | 7/2012 |
| CN | 102640233 B | 9/2015 |
| CN | 205810498 U | 12/2016 |
| CN | 206639664 U | 11/2017 |
| TW | 201523653 A | 6/2015 |
| WO | 2017110354 A1 | 6/2017 |

* cited by examiner

METHOD FOR MANUFACTURING SHUNT RESISTOR

RELATED APPLICATIONS

This application claims priority to China Application Serial Number 201810208505.5, filed Mar. 14, 2018, which is herein incorporated by reference.

BACKGROUND

Field of Invention

The present invention relates to a resistor. More particularly, the present invention relates to a method for manufacturing a shunt resistor having a modular structure.

Description of Related Art

In manufacturing a shunt resistor, an E-beam welding technique, a seam welding technique or a laser beam welding technique is typically used to combine a highly electrically-conductive electrode material with a resistance alloy material to form a resistance composite material. Then, the resistance composite material is divided and punched to form a preliminary model for plural shunt resistors. Next, resistance of the preliminary model of the shunt resistor is trimmed and adjusted by using a resistance trimming apparatus, so as to achieve an accuracy of the resistance of the shunt resistor.

However, an E-beam welding operation has to be performed in vacuum for the whole process, thus increasing welding cost. In addition, during the E-beam welding operation, materials are likely to be spattered, thus not only affecting a main body of the resistance alloy material that results in a bad control on the resistance of the shunt resistor, but also forming holes and/or spattered protrusions on a surface of the shunt resistor that results in a poor appearance of the shunt resistor. Furthermore, if the depth of the E-beam is not appropriately adjusted during welding, obvious weld beads are formed, and the resistance of the shunt resistor is also hard to be controlled. Moreover, when punching is performed, the stress in the resistance composite material is changed, thus causing the resistance of the shunt resistor to be changed. Accordingly, it needs a lot time to trim the resistance of the shunt resistor that is formed by using the E-beam welding technique. A remnant of the resistance composite material after being punched is a composite material of the electrode material and the resistance alloy material, and thus is difficult to be recycled.

When being aligned and emitted toward top and bottom sides of the resistance composite material for welding the resistance composite material, the laser beams are often too large or too small, thus resulting in weld beads with poor appearance, and poor control of the resistance of the shunt resistor. In addition, the laser beam welding technique also has disadvantages including of difficultly recycling remnants of the material and requiring a lot time of trimming the resistance.

SUMMARY

One objective of the present invention is to provide a method for manufacturing a shunt resistor, in which an electrode material of high electric conductivity and a resistance alloy material are respectively used to form the first electrode plate and the second electrode plate, and the resistor plate, which form a resistor module, and then the resistor module is pressed and is applied with high current to form a shunt resistor. Thus, the resistance of the resistor plate can be accurately calculated in forming the resistor plate, such that an accuracy of the resistance of the shunt resistor is enhanced, and time for trimming the resistance of the shunt resistor is greatly reduced, thereby effectively increasing productivity.

Another objective of the present invention is to provide a method for manufacturing a shunt resistor, in which conductive modules are respectively placed on two opposite ends of a connection surface between the first electrode plate and the resistor plate and two opposite ends of a connection surface between the second electrode plate and the resistor plate, and current is directly applied to the connection surfaces, such that the current is centered on the connection surfaces, and the heat generated by applying the current is also centered on the connection surfaces, thereby greatly reducing energy consumption for welding the resistor module and decreasing the production cost of the shunt resistor.

Still another objective of the present invention is to provide a method for manufacturing a shunt resistor, in which the electrode material and the resistance material are individually divided to form electrode plates and resistor plates, such that utilization of the electrode material and the resistance material is increased, remnants of the electrode material and the resistance material are easy to be recycled, and the shunt resistors may be in various shapes according to the practical requirements.

According to the aforementioned objectives, the present invention provides a method for manufacturing a shunt resistor. In this method, a resistor plate is provided, in which the resistor plate has a first side surface and a second side surface opposite to each other. A first electrode plate and a second electrode plate are pressed onto the first side surface and the second side surface of the resistor plate respectively, so as to form a first connection surface between the first electrode plate and the resistor plate, and to form a second connection surface between the second electrode plate and the resistor plate. A first conductive module is placed on two opposite ends of the first connection surface, and a second conductive module is placed on two opposite ends of the second connection surface. A current is applied to the first connection surface and the second connection surface by using the first conductive module and the second conductive module respectively, thereby welding the first electrode plate and the resistor plate at the first connection surface, and welding the second electrode plate and the resistor plate at the second connection surface.

According to one embodiment of the present invention, the first side surface of the resistor plate is formed with at least one first splice part, the second side surface is formed with at least one second splice part, the first electrode plate is formed with at least one first connection part, and the second electrode plate is formed with at least one second connection part. Before the first electrode plate and the second electrode plate are pressed onto the first side surface and the second side surface of the resistor plate respectively, the method further includes splicing the first splice part and the second splice part with the first connection part and the second connection part correspondingly and respectively, thereby respectively pre-combining the first electrode plate and the second electrode plate with the first side surface and the second side surface of the resistor plate.

According to one embodiment of the present invention, placing the first conductive module on the two opposite ends of the first connection surface, and placing the second conductive module on the two opposite ends of the second connection surface further include pressing the two opposite ends of the first connection surface by using the first conductive module, and pressing the two opposite ends of the second connection surface by using the second conductive module.

According to one embodiment of the present invention, the first conductive module and the second conductive module include carbon plates or tungsten plates.

According to one embodiment of the present invention, when the current is applied, the current is substantially parallel to the first connection surface and the second connection surface.

According to one embodiment of the present invention, applying the current is performed in an inert gas environment.

According to one embodiment of the present invention, the method further includes placing the first electrode plate and the second electrode plate on a first heat conductive base and a second heat conductive base respectively during applying the current.

According to the aforementioned objectives, the present invention further provides a method for manufacturing a shunt resistor. In this method, plural resistor modules are placed on a conveyer, in which each of the resistor modules includes a resistor plate, a first electrode plate, and a second electrode plate, the resistor plate has a first side surface and a second side surface opposite to the first side surface, the first electrode plate splices with the first side surface of the resistor plate, and the second electrode plate splices with the second side surface of the resistor plate. A pressing step is performed on each of the resistor modules sequentially through the first electrode plate and the second electrode plate of each of the resistor modules, thereby forming a first connection surface between the first electrode plate and the first side surface of the resistor plate of each of the resistor modules, and forming a second connection surface between the second electrode plate and the second side surface of the resistor plate of each of the resistor modules. A current is applied to the resistor modules conveyed by the conveyer sequentially by using a first conductive module and a second conductive module, thereby welding the first electrode plate and the resistor plate of each of the resistor modules at the first connection surface, and welding the second electrode plate and the resistor plate of each of the resistor modules at the second connection surface, in which the first conductive module and the second conductive module are respectively placed on two opposite ends of the first connection surface between the first electrode plate and the resistor plate of each of the resistor modules, and two opposite ends of the second connection surface between the second electrode plate and the resistor plate of each of the resistor modules.

According to one embodiment of the present invention, applying the current to each of the resistor modules further includes pressing the two opposite ends of the first connection surface and the two opposite ends of the second connection surface by using the first conductive module and the second conductive module respectively, in which the current is substantially parallel to the first connection surface and the second connection surface.

According to one embodiment of the present invention, the method further includes placing the first electrode plate and the second electrode plate of each of the resistor modules on a first heat conductive base and a second heat conductive base respectively during applying the current, and applying the current to each of the resistor modules is performed in an inert gas environment.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
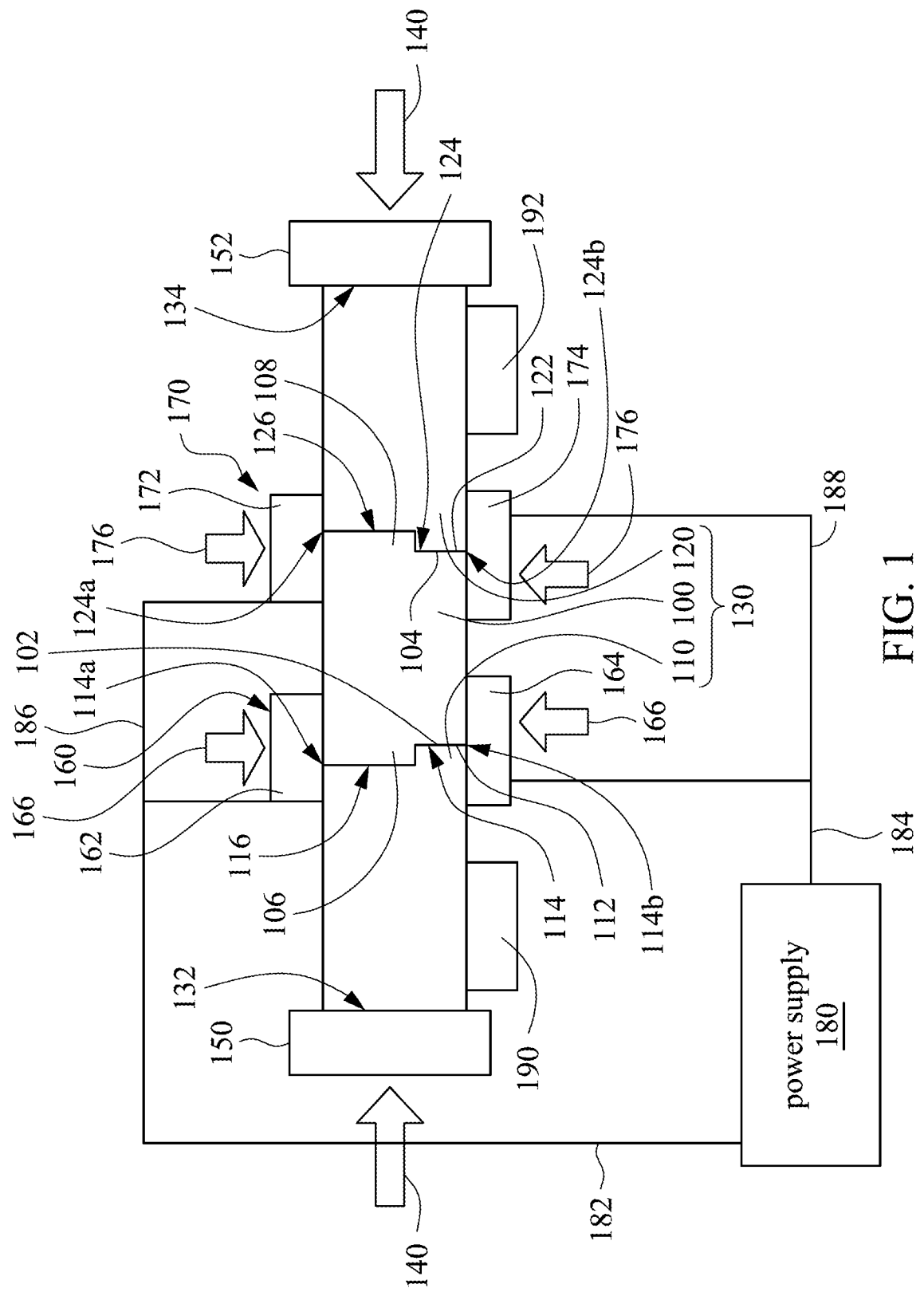
FIG. 1 is a schematic diagram of an installation for manufacturing a shunt resistor in accordance with a first embodiment of the present invention.
Figure 2:
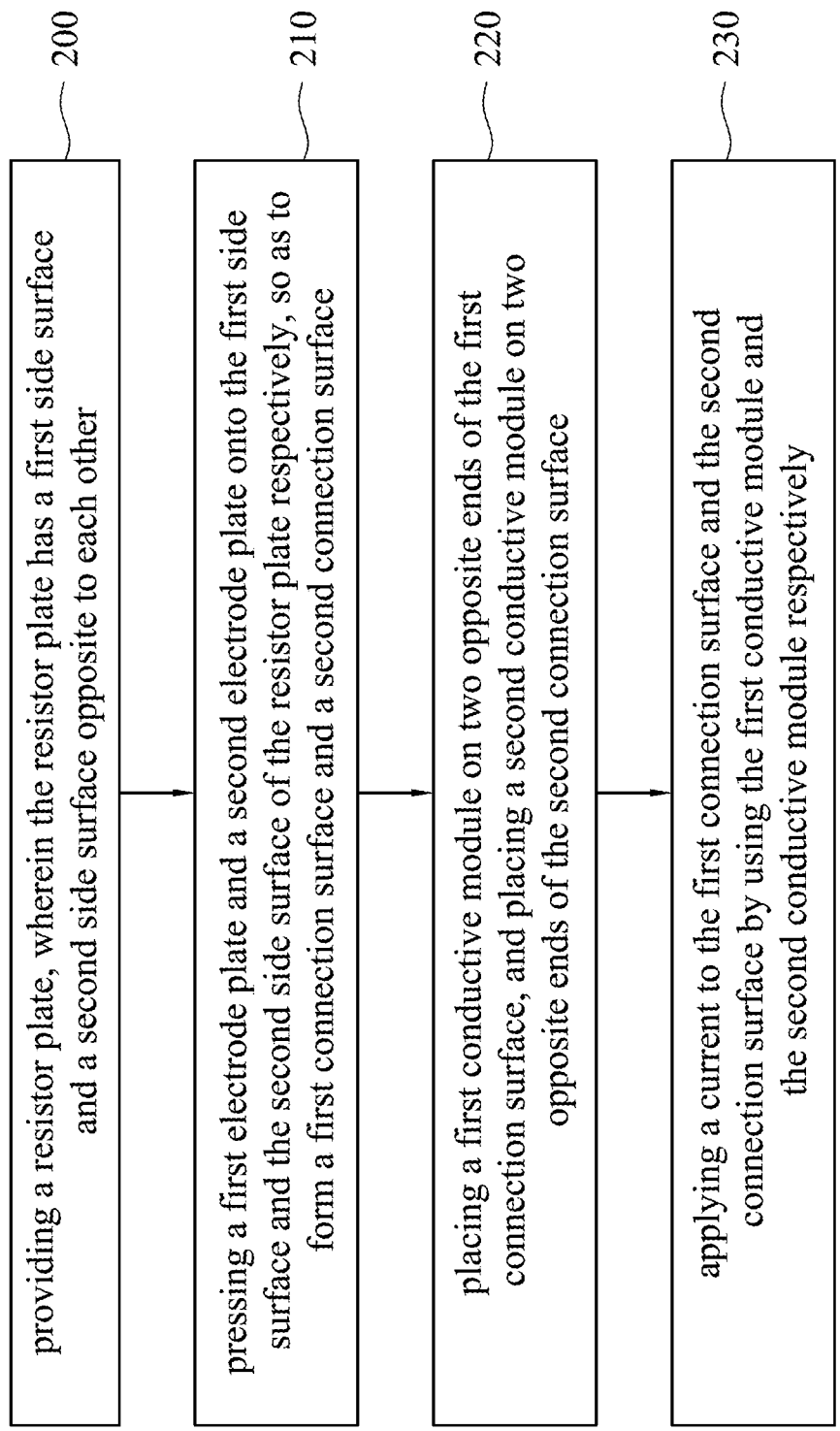
FIG. 2 is a flow chart of a method for manufacturing a shunt resistor in accordance with the first embodiment of this invention.

Referring to FIG. 1 and FIG. 2, FIG. 1 is a schematic diagram of an installation for manufacturing a shunt resistor in accordance with a first embodiment of the present invention, and FIG. 2 is a flow chart of a method for manufacturing a shunt resistor in accordance with the first embodiment of this invention. In the present embodiment, in manufacturing a shunt resistor, a step 200 is firstly performed to provide a resistor plate 100. The resistor plate 100 has a first side surface 102 and a second side surface 104 opposite to the first side surface 102. The resistor plate 100 may be formed by punching a resistance alloy material, so as to form the resistor plate 100 with a desired shape and resistance. For example, the resistor plate 100 may be formed from a MnCuSn alloy, a MnCuNi alloy, a MnCu alloy, a NiCrAl alloy, a NiCrAlSi alloy, or a FeCrAl alloy.

Then, a step 210 is performed to provide a first electrode plate 110 and a second electrode plate 120, and to respectively place the first electrode plate 110 and the second electrode plate 120 at a side of the first side surface 102 and a side of the second side surface 104 of the resistor plate 100. The resistor plate 100, the first electrode plate 110, and the second electrode plate 120 may form a resistor module 130. The resistor module 130 has a first side end 132 and a second side end 134 opposite to the first side end 132. A pressure 140 is applied to the first electrode plate 110 and the second electrode plate 120, so as to press the first electrode plate 110 onto the first side surface 102 of the resistor plate 100 from the first side end 132 of the resistor module 130, and to press the second electrode plate 120 onto the second side surface 104 of the resistor plate 100 from the second side end 134 of the resistor module 130. With the pressing step, a side surface 112 of the first electrode plate 110 is adhered to the first side surface 102 of the resistor plate 100, thereby forming a first connection surface 114 between the first electrode plate 110 and the resistor plate 100; and a side surface 122 of the second electrode plate 120 is adhered to the second side surface 104 of the resistor plate 100, thereby forming a second connection surface 124 between the second electrode plate 120 and the resistor plate 100. The first connection surface 114 has a first end 114a and a second end 114b opposite to the first end 114a, and the second connection surface 124 has a first end 124a and a second end 124b opposite to the first end 124a. The pressure 140 may preferably range from about 0.1 MPa to about 10 MPa depending on a current applied to the resistor module 130. In some examples, a first pressing module 150 may be used to press the first electrode plate 110, and a second pressing module 152 may be simultaneously used to press the second electrode plate 120. Materials of the first pressing module 150 and the second pressing module 152 preferably use high-temperature resistant materials, such as materials having melting points which exceed 3000 degrees Celsius. In some exemplary examples, the first pressing module 150 and the second pressing module 152 may be carbon plates or tungsten plates.

The first electrode plate 110 and the second electrode plate 120 may be formed by punching a conductive electrode material, so as to form electrode plates with desired shapes. Materials of the first electrode plate 110 and the second electrode plate 120 are materials of high electric conductivity, such as copper (Cu). Thus, the first connection surface 114 formed between the first electrode plate 110 and the resistor plate 100 and the second connection surface 124 formed between the second electrode plate 120 and the resistor plate 100 are hetero-junctions.

In the present embodiment, the first side surface 102 of the resistor plate 100 is formed with at least one first splice part 106, and the second side surface 104 of the resistor plate 100 is formed with at least one second splice part 108. Shapes of the first splice part 106 and the second splice part 108 may be the same, or may be different from each other. In addition, the first splice part 106 may be a convex part protruding from the first side surface 102 of the resistor plate 100, and the second splice part 108 may be a convex part protruding from the second side surface 104 of the resistor plate 100. The first splice part 106 may be a concave part caving in the first side surface 102 of the resistor plate 100, and the second splice part 108 may be a concave part caving in the second side surface 104 of the resistor plate 100. Types of the first splice part 106 and the second splice part 108 may be different from each other. For example, one of the first splice part 106 and the second splice part 108 is a concave part, and the other one is a convex part.

Corresponding to the structure of the first side surface 102 of the resistor plate 100, the side surface 112 of the first electrode plate 110 is formed with at least one first connection part 116. In addition, corresponding to the structure of the second side surface 104 of the resistor plate 100, the side surface 122 of the second electrode plate 120 is formed with at least one second connection part 126. A shape of the first connection part 116 is complementary to a shape of the first splice part 106, and the first connection part 116 can be spliced with the first splice part 106 correspondingly. A shape of the second connection part 126 is complementary to a shape of the second splice part 108, and the second connection part 126 can be spliced with the second splice part 108 correspondingly. Before the first electrode plate 110 is pressed to the first side surface 102 of the resistor plate 100 and the second electrode plate 120 is pressed to the second side surface 104 of the resistor plate 100, the first splice part 106 of the resistor plate 100 and the first connection part 116 of the first electrode plate 110 may be correspondingly spliced, and the second splice part 108 of the resistor plate 100 and the second connection part 126 of the second electrode plate 120 may be correspondingly spliced. Thus, the first electrode plate 110 is pre-combined with the first side surface 102 of the resistor plate 100, and the second electrode plate 120 is pre-combined with the second side surface 104 of the resistor plate 100.

Then, a step 220 is performed to provide a first conductive module 160 and a second conductive module 170, in which the first conductive module 160 includes a first conductive element 162 and a second conductive element 164 which are high-temperature resistant, and the second conductive module 170 includes a first conductive element 172 and a high-temperature resistant second conductive element 174 which are high-temperature resistant. Next, the first conductive element 162 of the first conductive module 160 is placed on the first end 114a of the first connection surface 114, and the second conductive element 164 of the first conductive module 160 is placed on the on the second end 114b of the first connection surface 114. The first conductive element 172 of the second conductive module 170 is placed on the first end 124a of the second connection surface 124, and the second conductive element 174 of the second conductive module 170 is placed on the second end 124b of the second connection surface 124. Materials of the first conductive element 162 and the second conductive element 164 of the first conductive module 160 and the first conductive element 172 and the second conductive element 174 of the second conductive module 170 preferably use conductive materials with melting points exceeding 3000 degrees Celsius. In some exemplary examples, the first conductive element 162 and the second conductive element 164 of the first conductive module 160 and the first conductive element 172 and the second conductive element 174 of the second conductive module 170 may be carbon plates or tungsten plates. In addition, the first conductive element 162 and the second conductive element 164 of the first conductive module 160 may be used to apply a pressure 166 to the first end 114a and the second end 114b of the first connection surface 114 respectively, and the first conductive element 172 and the second conductive element 174 of the second conductive module 170 may be used to apply a pressure 176 to the first end 124a and the second end 124b of the second connection surface 124 respectively. For example, the pressures 166 and 176 may be about dozens of kilograms (kgf).

Subsequently, a step 230 is performed to apply a current to the first connection surface 114 through the first conductive module 160 and to apply a current to the second connection surface 124 through the second conductive module 170 by using a power supply 180. The power supply 180 may be a direct current (DC) power supply or an alternating current (AC) power supply. The power supply 180 preferably applies high current to the first connection surface 114 and the second connection surface 124. For example, the current applied by the power supply 180 may range from about 700 A to about 800 A, or higher. In some examples, two electrodes of the power supply 180 are connected to the first conductive element 162 and the second conductive element 164 of the first conductive module 160 respectively via a first wire 182 and a second wire 184, and the electrodes of the power supply 180 are also connected to the first conductive element 172 and the second conductive element 174 of the second conductive module 170 respectively via the first wire 182 and a third wire 186, and the second wire 184 and a fourth wire 188. The power supply 180 applies the current to the first connection surface 114 from the first end 114a and the second end 114b of the first connection surface 114 through the first wire 182 and the second wire 184, and the first conductive module 160. The power supply 180 also applies the current to the second connection surface 124 from the first end 124a and the second end 124b of the second connection surface 124 through the first wire 182 and the third wire 186, the second wire 184 and the fourth wire 188, and the second conductive module 170. In some examples, when the current is applied, the current is substantially parallel to the first connection surface 114 and the second connection surface 124.

The resistance at the hetero-junctions, i.e. the first connection surface 114 and the second connection surface 124 is greatest, the first connection surface 114 and the second connection surface 124 are areas having greatest power and highest temperature, such that portions of the resistor plate 100 and the first electrode plate 110 at the first connection surface 114 and portions of the resistor plate 100 and the second electrode plate 120 at the second connection surface 124 melt firstly. At present, with the pressures 140, 166, and 176, the first electrode plate 110 and the second electrode plate 120 both exchange portions of the materials with the resistor plate 100, such that the first electrode plate 110 and the resistor plate 100 are welded at the first connection surface 114, and the second electrode plate 120 and the resistor plate 100 are welded at the second connection surface 124, thereby forming a shunt resistor.

In some exemplary examples, applying the current to the first connection surface 114 and the second connection surface 124 is performed in an inert gas environment to protect the welded portions from being oxidized. In addition, when the current is applied to the first connection surface 114 and the second connection surface 124, the first electrode plate 110 may be placed on a first heat conductive base 190, and the second electrode plate 120 may be placed on a second heat conductive base 192. In some exemplary examples, the first heat conductive base 190 is closer to the first pressing module 150 and is farther away the first connection surface 114, and the second heat conductive base 192 is closer to the second pressing module 152 and is farther away the second connection surface 124, such that the heat of the first electrode plate 110 is conducted by using the first heat conductive base 190, and the heat of the second electrode plate 120 is conducted by using the second heat conductive base 192. Thus, the heat is centered on the first connection surface 114 and the second connection surface 124.

In this method, the electrode material and the resistance alloy material are respectively used to form the first electrode plate 110 and the second electrode plate 120, and the resistor plate 100, which form the resistor module 130, and then the first connection surface 114 and the second connection surface 124 are pressed and are directly applied with high current to weld the first electrode plate 110 and the second electrode plate 120 on two sides of the resistor plate 100 respectively. Thus, the resistance of the resistor plate 100 can be accurately calculated, and the resistor plate 100 needs not to be punched and divided after welding, such that an accuracy of the resistance of the shunt resistor is enhanced, thereby greatly reducing time for trimming the resistance of the shunt resistor. Furthermore, the current is directly applied to the first connection surface 114 and the second connection surface 124, such that the current is centered on the connection surfaces, and the heat generated by applying the current is also centered on the connection surfaces, thus greatly decreasing energy consumption for welding the resistor module 130. Moreover, the electrode material and the resistance alloy material are respectively divided into the first electrode plate 110 and the second electrode plate 120, and the resistor plate 100, then the first electrode plate 110, the second electrode plate 120, and the resistor plate 100 are welded, such that utilization of the electrode material and the resistance material is increased, remnants of the electrode material and the resistance material are easy to be recycled, and the shunt resistors may be in various shapes according to the practical requirements.

Figure 3:
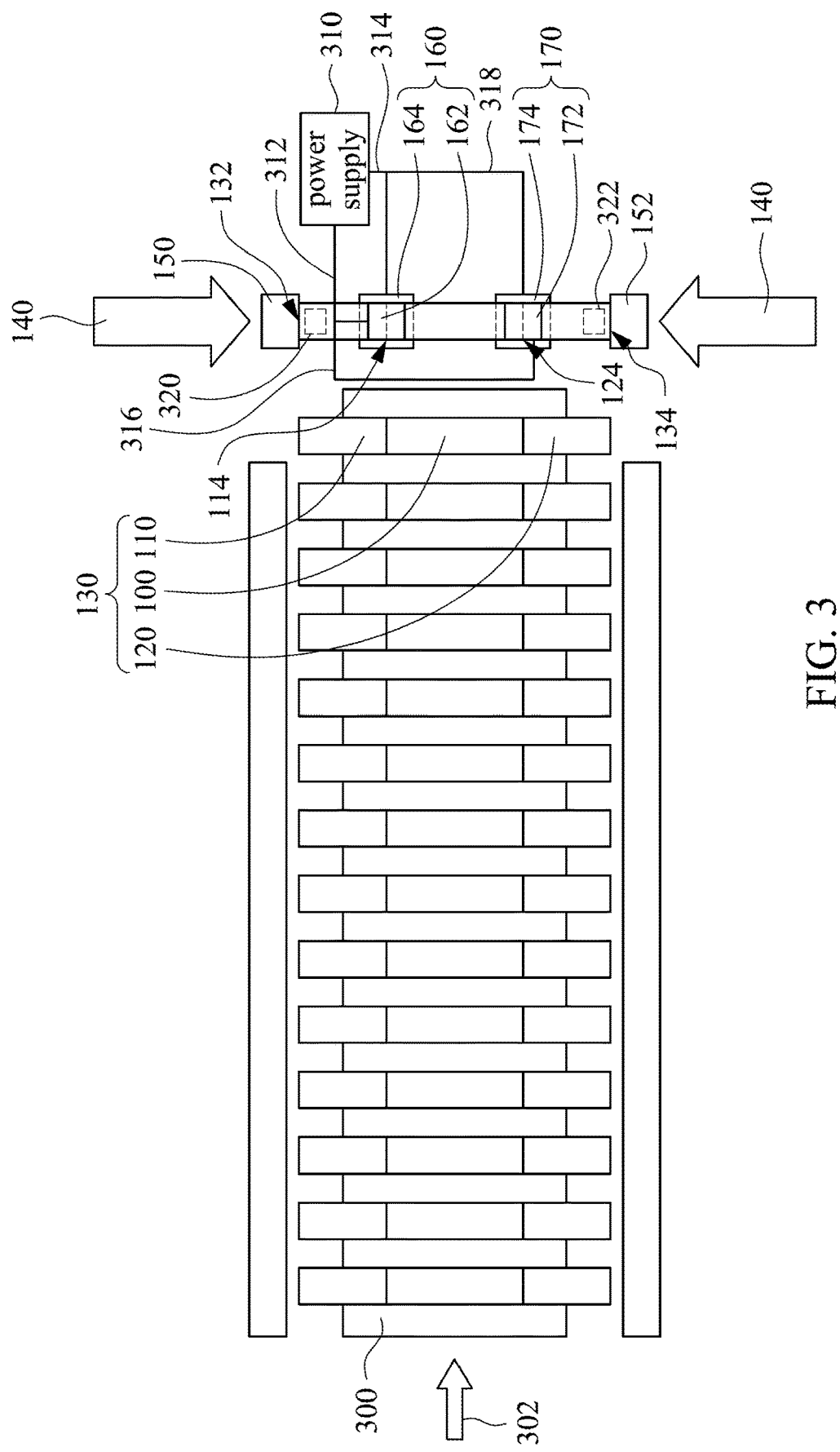
FIG. 3 is a schematic diagram of an installation for manufacturing a shunt resistor in accordance with a second embodiment of the present invention.
Figure 4:
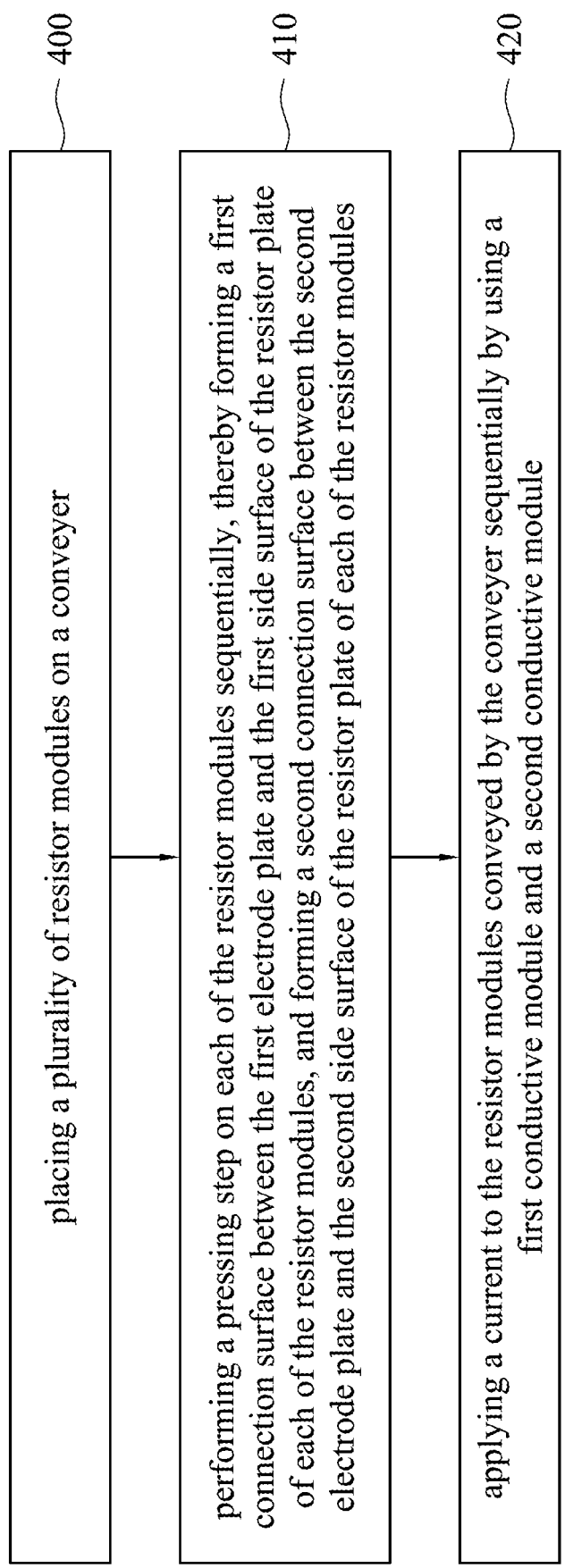
FIG. 4 is a flow chart of a method for manufacturing a shunt resistor in accordance with the second embodiment of this invention.

Referring to FIG. 3 and FIG. 4, FIG. 3 is a schematic diagram of an installation for manufacturing a shunt resistor in accordance with a second embodiment of the present invention, and FIG. 4 is a flow chart of a method for manufacturing a shunt resistor in accordance with the second embodiment of this invention. In the present embodiment, in manufacturing a shunt resistor, a step 400 is firstly performed to provide various resistor modules 130 as shown in FIG. 1, and the resistor modules 130 are arranged on a conveyer 300 in sequence. The conveyer 300 can convey the resistor modules 130 forward along a direction 302. As described in the first embodiment, when the resistor module 130 is provided, the first splice part 106 of the resistor plate 100 may be correspondingly spliced with the first connection part 116 of the first electrode plate 110, and the second splice part 108 of the resistor plate 100 may be correspondingly spliced with the second connection part 126 of the second electrode plate 120. Thus, the first electrode plate 110 is pre-combined with the first side surface 102 of the resistor plate 100, and the second electrode plate 120 is pre-combined with the second side surface 104 of the resistor plate 100. The resistor modules 130 are transversely arranged on the conveyer 300, and an extending direction of each of the resistor modules 130 may be substantially perpendicular to the direction 302. In addition, the first electrode plate 110 and the second electrode plate 120 of each of the resistor modules 130 may respectively protrude two opposite sides of the conveyer 300. For example, the conveyer 300 may be a conveyer belt. The structures and materials of the resistor modules 130 are described in the aforementioned embodiment, and repeat no more here.

Then, a step 410 is performed to press the resistor modules 130 conveyed by the conveyer 300 in sequence. In pressing each of the resistor modules 130, a pressure 140 is applied to the first electrode plate 110 and the second electrode plate 120, so as to press the first electrode plate 110 onto the first side surface 102 of the resistor plate 100 from the first side end 132 of the resistor module 130, and to press the second electrode plate 120 onto the second side surface 104 of the resistor plate 100 from the second side end 134 of the resistor module 130. Thus, as shown in FIG. 1, a side surface 112 of the first electrode plate 110 is adhered to the first side surface 102 of the resistor plate 100 thereby forming a first connection surface 114, and a side surface 122 of the second electrode plate 120 is adhered to the second side surface 104 of the resistor plate 100 thereby forming a second connection surface 124. The first connection surface 114 and the second connection surface 124 are hetero-junctions formed by splicing. The first connection surface 114 has a first end 114a and a second end 114b opposite to the first end 114a, and the second connection surface 124 has a first end 124a and a second end 124b opposite to the first end 124a. The pressure 140 may preferably range from about 0.1 MPa to about 10 MPa depending on a current applied to the resistor module 130. In the embodiment, a first pressing module 150 may be used to press the first electrode plates 110 of the resistor modules 130, and a second pressing module 152 may be simultaneously used to press the second electrode plates 120 of the resistor modules 130.

Subsequently, a step 420 is performed to provide a first conductive module 160 and a second conductive module 170, in which the first conductive module 160 includes a first conductive element 162 and a second conductive element 164, and the second conductive module 170 includes a first conductive element 172 and a second conductive element 174, in which the first conductive element 162, the second conductive element 164, the first conductive element 172 and the second conductive element 174 are high-temperature resistant. In addition, as shown in FIG. 1, the first conductive element 162 and the second conductive element 164 of the first conductive module 160 are respectively placed on the first end 114a and the second end 114b of the first connection surface 114, and the first conductive element 172 and the second conductive element 174 of the second conductive module 170 are respectively placed on the first end 124a and the second end 124b of the second connection surface 124. Furthermore, the first conductive element 162 and the second conductive element 164 of the first conductive module 160 may be used to apply a pressure 166 to the first end 114a and the second end 114b of the first connection surface 114 respectively, and the first conductive element 172 and the second conductive element 174 of the second conductive module 170 may be used to apply a pressure 176 to the first end 124a and the second end 124b of the second connection surface 124 respectively. The first conductive element 162 and the second conductive element 164 may have the same size, or may have different sizes. The first conductive element 172 and the second conductive element 174 may have the same size, or may have different sizes.

Now, a current is applied to the first connection surfaces 114 of the resistor modules 130 conveyed by the conveyer 300 in sequence through the first conductive module 160 by using a power supply 310. A current is applied to the second connection surfaces 124 of the resistor modules 130 conveyed by the conveyer 300 in sequence through the second conductive modules 170 by using the power supply 310. When the current is applied, the first conductive element 162 and the second conductive element 164 of the first conductive module 160 may be used to press the first end 114a and the second end 114b of the first connection surface 114 respectively, and the first conductive element 172 and the second conductive element 174 of the second conductive module 170 may be used to press the first end 124a and the second end 124b of the second connection surface 124 respectively. The power supply 310 may be a direct current (DC) power supply or an alternating current (AC) power supply. In some exemplary examples, the current applied by the power supply 310 may range from about 700 A to about 800 A, or higher.

In some examples, two electrodes of the power supply 310 are connected to the first conductive element 162 and the second conductive element 164 of the first conductive module 160 respectively via a first wire 312 and a second wire 314, and the electrodes of the power supply 310 are also connected to the first conductive element 172 and the second conductive element 174 of the second conductive module 170 respectively via the first wire 312 and a third wire 316, and the second wire 314 and a fourth wire 318. The power supply 310 applies the current to the first connection surface 114 from the first end 114a and the second end 114b of the first connection surface 114 through the first wire 312 and the second wire 314, and the first conductive module 160, thereby welding the resistor plate 100 and the first electrode plate 110 at the first connection surface 114. The power supply 310 applies the current to the second connection surface 124 from the first end 124a and the second end 124b of the second connection surface 124 through the first wire 312 and the third wire 316, the second wire 314 and the fourth wire 318, and the second conductive module 170, thereby welding the resistor plate 100 and the second electrode plate 120 at the second connection surface 124. Referring to FIG. 1 simultaneously, with the pressures 140, 166, and 176, the first electrode plate 110 and the resistor plate 100 of each of the resistor modules 130 are welded at the first connection surface 114, and the second electrode plate 120 and the resistor plate 100 of each of the resistor modules 130 are welded at the second connection surface 124, so as to form various shunt resistors in sequence. In some examples, when the current is applied, the current is substantially parallel to the first connection surface 114 and the second connection surface 124.

In some exemplary examples, applying the current to the first connection surface 114 and the second connection surface 124 is performed in an inert gas environment to protect the welded portions from being oxidized. In addition, when the current is applied to the first connection surface 114 and the second connection surface 124, the first electrode plate 110 may be placed on a first heat conductive base 320, and the second electrode plate 120 may be placed on a second heat conductive base 322. In some exemplary examples, the first heat conductive base 320 is closer to the first pressing module 150 and is farther away the first connection surface 114, and the second heat conductive base 322 is closer to the second pressing module 152 and is farther away the second connection surface 124.

The method simultaneously presses the first side end 132 and the second side end 134 of each of the resistor modules 130 in sequence as the conveying of the conveyer 300, and uses a welding method which directly applies current to the first connection surface 114 and the second connection surface 124 of each of the resistor modules 130 by using the first conductive module 160 and the second conductive module 170 to continuously manufacture the shunt resistors, such that productivity is greatly enhanced.

Although the present invention has been described in considerable detail with reference to certain embodiments thereof, the foregoing embodiments of the present invention are illustrative of the present invention rather than limiting of the present invention. It will be apparent to those having ordinary skill in the art that various modifications and variations can be made to the present invention without departing from the scope or spirit of the invention. Therefore, the spirit and scope of the appended claims should not be limited to the description of the embodiments contained herein.

What is claimed is:

1. A method for manufacturing a shunt resistor, the method comprising:
    providing a resistor plate, wherein the resistor plate has a first side surface and a second side surface opposite to each other;
    pressing a first electrode plate and a second electrode plate onto the first side surface and the second side surface of the resistor plate respectively, so as to form a first connection surface between the first electrode plate and the resistor plate, and to form a second connection surface between the second electrode plate and the resistor plate;
    placing a first conductive module on two opposite ends of the first connection surface, and placing a second conductive module on two opposite ends of the second connection surface; and
    applying a current to the first connection surface and the second connection surface by using the first conductive module and the second conductive module respectively, thereby welding the first electrode plate and the resistor plate at the first connection surface, and welding the second electrode plate and the resistor plate at the second connection surface, wherein when the current is applied, the current is substantially parallel to the first connection surface and the second connection surface.

2. The method of claim 1, wherein
the first side surface of the resistor plate is formed with at least one first splice part, the second side surface is formed with at least one second splice part, the first electrode plate is formed with at least one first connection part, and the second electrode plate is formed with at least one second connection part; and
before pressing the first electrode plate and the second electrode plate onto the first side surface and the second side surface of the resistor plate respectively, the method further comprises splicing the first splice part and the second splice part with the first connection part and the second connection part correspondingly and respectively, thereby respectively pre-combining the first electrode plate and the second electrode plate with the first side surface and the second side surface of the resistor plate.

3. The method of claim 1, wherein placing the first conductive module on the two opposite ends of the first connection surface, and placing the second conductive module on the two opposite ends of the second connection surface further comprise pressing the two opposite ends of the first connection surface by using the first conductive module, and pressing the two opposite ends of the second connection surface by using the second conductive module.

4. The method of claim 1, wherein the first conductive module and the second conductive module comprise carbon plates or tungsten plates.

5. The method of claim 1, wherein applying the current is performed in an inert gas environment.

6. The method of claim 1, further comprising:
placing the first electrode plate and the second electrode plate on a first heat conductive base and a second heat conductive base respectively during applying the current.

7. A method for manufacturing a shunt resistor, the method comprising:
placing a plurality of resistor modules on a conveyer, wherein each of the resistor modules comprises a resistor plate, a first electrode plate, and a second electrode plate, the resistor plate has a first side surface and a second side surface opposite to the first side surface, the first electrode plate is spliced with the first side surface of the resistor plate, and the second electrode plate is spliced with the second side surface of the resistor plate;
performing a pressing step on each of the resistor modules sequentially through the first electrode plate and the second electrode plate of each of the resistor modules, thereby forming a first connection surface between the first electrode plate and the first side surface of the resistor plate of each of the resistor modules, and forming a second connection surface between the second electrode plate and the second side surface of the resistor plate of each of the resistor modules; and
applying a current to the resistor modules conveyed by the conveyer sequentially by using a first conductive module and a second conductive module, thereby welding the first electrode plate and the resistor plate of each of the resistor modules at the first connection surface, and welding the second electrode plate and the resistor plate of each of the resistor modules at the second connection surface, wherein the first conductive module and the second conductive module are respectively placed on two opposite ends of the first connection surface between the first electrode plate and the resistor plate of each of the resistor modules, and two opposite ends of the second connection surface between the second electrode plate and the resistor plate of each of the resistor modules, and when the current is applied to each of the resistor modules, the current is substantially parallel to the first connection surface and the second connection surface.

8. The method of claim 7, wherein applying the current to each of the resistor modules further comprises:
pressing the two opposite ends of the first connection surface and the two opposite ends of the second connection surface by using the first conductive module and the second conductive module respectively.

9. The method of claim 7, further comprising:
placing the first electrode plate and the second electrode plate of each of the resistor modules on a first heat conductive base and a second heat conductive base respectively during applying the current; and
applying the current to each of the resistor modules is performed in an inert gas environment.

* * * * *